US009838155B2

(12) United States Patent
Zhai et al.

(10) Patent No.: US 9,838,155 B2
(45) Date of Patent: Dec. 5, 2017

(54) ERROR CORRECTION METHOD AND APPARATUS FOR RADIO LINK DATA

(71) Applicant: ZTE CORPORATION, Shenzhen, Guangdong Province (CN)

(72) Inventors: Xue Zhai, Shenzhen (CN); Qingqi Yu, Shenzhen (CN); Weitao Yuan, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 79 days.

(21) Appl. No.: 14/892,580

(22) PCT Filed: Apr. 21, 2014

(86) PCT No.: PCT/CN2014/075774
§ 371 (c)(1),
(2) Date: Dec. 29, 2015

(87) PCT Pub. No.: WO2014/187211
PCT Pub. Date: Nov. 27, 2014

(65) Prior Publication Data
US 2016/0112156 A1    Apr. 21, 2016

(30) Foreign Application Priority Data

May 23, 2013  (CN) .......................... 2013 1 0195043

(51) Int. Cl.
*H04W 36/30*   (2009.01)
*H04L 1/00*    (2006.01)
(Continued)

(52) U.S. Cl.
CPC ........... *H04L 1/0045* (2013.01); *H04B 7/022* (2013.01); *H04B 7/0885* (2013.01);
(Continued)

(58) Field of Classification Search
CPC ..... H04W 36/18; H04W 28/04; H04W 72/04; H04W 80/04; H04L 1/0045; H04L 1/0061
See application file for complete search history.

(56) References Cited

U.S. PATENT DOCUMENTS 6,975,604 B1 * 12/2005 Ishida ................... H04L 1/0002
                                                370/331
7,016,678 B1 *  3/2006 Kalliokulju ........... H04W 36/12
                                                370/331
(Continued)

FOREIGN PATENT DOCUMENTS

CN          1400752 A    3/2003
CN          1132363 C    12/2003
(Continued)

*Primary Examiner* — Andrew Lee
(74) *Attorney, Agent, or Firm* — Ling Wu; Stephen Yang; Ling and Yang Intellectual Property

(57) ABSTRACT

The embodiments of the present invention disclose a method and an apparatus of error re-correction for data of a radio link, and the method includes: when data of a plurality of radio links of a same user equipment received by a base station controller are all incorrect, the base station controller performing bitwise comparison processing on data of two radio links therein, obtaining a difference bit position sequence of the data of the two radio links; performing incorrect route segmentation processing on the data of the two radio link according to the difference bit position sequence, obtaining a plurality of incorrect route groups; performing cross substitution processing on incorrect route groups in the data of the two radio links by groups, and performing check processing on obtained data of a new radio link, until obtaining data of a radio link that are checked successfully.

10 Claims, 4 Drawing Sheets

(51) Int. Cl.
*H04B 7/022* (2017.01)
*H04W 36/18* (2009.01)
*H04B 7/08* (2006.01)
*H04W 28/04* (2009.01)

(52) U.S. Cl.
CPC .......... *H04B 7/0888* (2013.01); *H04W 28/04* (2013.01); *H04W 36/18* (2013.01); *H04L 1/0061* (2013.01)

(56) References Cited

U.S. PATENT DOCUMENTS

| | | | | |
|---|---|---|---|---|
| 7,042,858 | B1* | 5/2006 | Ma | H04L 1/0618 370/208 |
| 8,867,432 | B2* | 10/2014 | Lee | H04B 7/15592 370/274 |
| 9,277,487 | B2* | 3/2016 | Wang | H04J 11/004 |
| 9,565,606 | B2* | 2/2017 | Lee | H04W 36/18 |
| 2003/0224774 | A1* | 12/2003 | Cheng | H04L 1/1854 455/422.1 |
| 2009/0129334 | A1* | 5/2009 | Ma | H04B 7/022 370/331 |
| 2010/0150069 | A1* | 6/2010 | Fang | H04L 1/1607 370/328 |
| 2011/0218009 | A1* | 9/2011 | Morimoto | H04W 72/082 455/513 |
| 2011/0270994 | A1* | 11/2011 | Ulupinar | H04W 76/025 709/227 |
| 2014/0059662 | A1* | 2/2014 | Zhu | H04L 9/3271 726/6 |

FOREIGN PATENT DOCUMENTS

| | | |
|---|---|---|
| CN | 102082622 A | 6/2011 |
| CN | 102474387 A | 5/2012 |

* cited by examiner

ERROR CORRECTION METHOD AND APPARATUS FOR RADIO LINK DATA

TECHNICAL FIELD

The present document relates to the field of mobile communications, and more particularly to, a method and an apparatus of error re-correction for data of a radio link in a soft handover process.

BACKGROUND OF THE RELATED ART

With regard to services of the 3GPP protocol R99, the data frame at a user equipment side adds cyclic redundancy check (CRC) bits for source data and the coding is performed, a base station decodes the received data, and judges whether the received data are correct according to the CRC check.

A typical decoder has one important characteristic that the error bits occur intensively after the decoding.

Under a handover scenario, a base station controller receives data of multiple radio links from a same user equipment, which are decoded by multiple base stations, and the base station controller performs selection on received data of all radio links, and if the data of one radio link are correct, the base station controller selects the data of this correct radio link; otherwise, the base station controller selects data of one radio link of which signal quality is best among the data of all radio links, or discards the data of the radio links and informs the user equipment to perform retransmission.

For the above situation that the received data of all radio links are all incorrect, the conventional processing method cannot make good use of the processing performance of the system, and it will cause great impacts on the call quality of the R99 service, uplink capacity of the system and the standby time of the user equipment.

SUMMARY OF THE INVENTION

The purpose of the embodiments of the present invention is to provide a method and an apparatus of error re-correction for data of a radio link, which can better solve the problem that the conventional processing method cannot make good use of the processing performance of the system.

According to one aspect of the embodiment of the present invention, a method of error re-correction for data of a radio link is provided, comprising:

when data of a plurality of radio links of a same user equipment received by a base station controller are incorrect, the base station controller performing bitwise comparison processing on data of two radio links among the plurality of radio links, obtaining a difference bit position sequence of the data of the two radio links;

performing incorrect route segmentation processing on the data of the two radio link according to the difference bit position sequence, obtaining a plurality of incorrect route groups;

performing cross substitution processing on incorrect route groups in the data of the two radio links by groups, and performing check processing on obtained data of a new radio link, until obtaining data of a radio link that are checked successfully.

Preferably, before the step of performing bitwise comparison processing, the method further comprises:

a plurality of base stations respectively performing decoding and cyclic redundancy check processing on the received data of the plurality of radio links from the same user equipment, and respectively sending the data of the plurality of radio links including check results to the base station controller;

the base station controller judging whether the received data of the plurality of radio links are correct according to a check result in the data of each radio link;

when determining that correct data of a radio link exist, selecting the data of the radio link.

Preferably, the step of the bitwise comparison processing comprises:

when the base station controller determines that the data of the plurality of radio links are all incorrect, the base station controller selecting data of at least two radio links from the data of the plurality of the radio links;

selecting data of two radio links from the data of the selected radio links and performing bitwise comparisons on the data of the two radio links successively, obtaining a difference bit position sequence in which difference bit position numbers are taken as sequence elements;

wherein the difference bit position numbers refer to bit numbers of the data of the two radio links which have different bit values.

Preferably, the step of the incorrect route segmentation processing comprises:

calculating a distance between adjacent difference bit position numbers in the data of the two radio links according to adjacent difference bit position numbers in the difference bit position sequence;

comparing the distance between the adjacent difference bit position numbers with a predetermined distance threshold;

if the distance is less than the predetermined distance threshold, classifying bits corresponding to the adjacent difference bit position numbers into a same incorrect route group;

segmenting the data of the two radio links respectively according to an incorrect route group to which a bit corresponding to each difference bit position number belongs, obtaining a plurality of incorrect route groups of the data of the two radio links.

Preferably, the step of obtaining data of a radio link which are checked successfully comprises:

performing cross substitution on a Nth incorrect route group in the data of the two radio links, wherein, the N is greater than or equal to 1;

performing cyclic redundancy check processing respectively on data of the two radio links obtained through the cross substitution;

when data of a radio link on which the cyclic redundancy check are performed successfully exist, selecting the data of the radio link on which the cyclic redundancy check are performed successfully after the cross substitution;

when the cyclic redundancy check fails, performing cross substitution processing on a N+1th incorrect route group in the data of the two radio links, performing cyclic redundancy check processing on data of radio links obtained through the cross substitution, until obtaining data of a radio link on which the cyclic redundancy check are performed successfully.

According to another aspect of the embodiment of the present invention, an apparatus of error re-correction for data of a radio link is provided, comprising:

a difference bit position sequence determining module, configured to, when data of a plurality of radio links of a same user equipment received by a base station controller are all incorrect, perform bitwise comparison processing on data of two radio links among the data of the plurality of radio links, and obtain a difference bit position sequence of the data of the two radio links;

an incorrect route group determining module, configured to perform incorrect route segmentation processing on the data of the two radio link according to the difference bit position sequence, and obtain a plurality of incorrect route groups;

an error re-correction module, configured to perform cross substitution processing on incorrect route groups in the data of the two radio links by groups, and perform check processing on obtained data of new radio links, until data of radio links that are checked successfully are obtained.

Preferably, the apparatus further comprises:

a data receiving module, configured to receive data of a plurality of radio links of a same user equipment on which decoding and cyclic redundancy check processing have been performed respectively by a plurality of base stations, wherein the data of the plurality of radio links include check results of the cyclic redundancy check processing;

a radio link data judgment module, configured to judge whether the received data of the plurality of radio links are correct according to a check result in the data of each radio link;

a radio link data selection module, configured to, when it is judged that correct data of a radio link exist, select the data of the radio link.

Preferably, the difference bit position sequence determining module comprises:

a data selection submodule, configured to, when the data of the plurality of radio links are all incorrect, select data of at least two radio links from the data of the plurality of the radio links;

a bitwise comparison submodule, configured to select data of two radio links from the data of the selected radio links and perform bitwise comparisons on the data of the two radio links successively, obtain a difference bit position sequence in which difference bit position numbers are taken as sequence elements, wherein the difference bit position numbers refer to bit numbers of the data of the two radio links which have different bit values.

Preferably, the incorrect route group determining module comprises:

a distance calculation submodule, configured to calculate a distance between adjacent difference bit position numbers in the data of the two radio links according to adjacent difference bit position numbers in the difference bit position sequence;

a distance comparison submodule, configured to compare the distance between the adjacent difference bit position numbers with a predetermined distance threshold;

an incorrect route group classifying submodule, configured to, if the distance is less than the predetermined distance threshold, classify bits corresponding to the adjacent difference bit position numbers into a same incorrect route group;

an incorrect route group segmentation submodule, configured to segment the data of the two radio links respectively according to an incorrect route group to which a bit corresponding to each difference bit position number belongs, and obtain a plurality of incorrect route groups of the data of the two radio links.

Preferably, the error re-correction module comprises:

a cross substitution submodule, configured to perform cross substitution on a Nth incorrect route group in the data of the two radio links, wherein, the N is greater than or equal to 1;

a redundancy check submodule, configured to perform cyclic redundancy check processing respectively on data of two radio links obtained through the cross substitution;

a data selection submodule, configured to, when data of a radio link on which the cyclic redundancy check is performed successfully exist, select the data of the radio link on which the cyclic redundancy check is performed successfully after the cross substitution; when the cyclic redundancy check fails, the cross substitution submodule performs cross substitution on an N+1th incorrect route group in the data of the two radio link, then the redundancy check submodule performs cyclic redundancy check processing on data of radio links obtained through the cross substitution, until data of a radio link on which the cyclic redundancy check is performed successfully are obtained.

Compared with the related art, the beneficial effects of the embodiment of the present invention lie in that:

The embodiments of the present invention can achieve the error re-correction for the data of the radio link under the soft handover scenario, which can effectively improve the success rate of the soft handover, uplink capacity of the system and the standby time of the user equipment.

PREFERRED EMBODIMENTS OF THE PRESENT INVENTION

The preferred embodiments of the present invention are described in detail with reference to the accompanying drawings hereinafter, the embodiments illustrated hereinafter are used to describe and explain the present document, rather than constituting an limitation to the present document.

Figure 1:
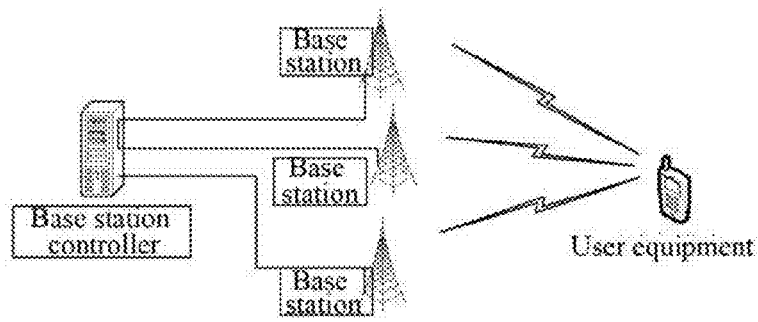
FIG. 1 is a schematic diagram of combing data of radio links under a soft handover scenario provided by an embodiment of the present invention.

FIG. 1 is a schematic diagram of combing data of radio links under a soft handover scenario provided by the embodiment of the present invention, and as shown in FIG. 1, under the soft handover scenario, a base station controller receives data of multiple radio links of a same user equipment, which are decoded by multiple base stations. The base station controller performs selection on received data of all radio links, if the data of one radio link are correct, the base station controller selects the data of this correct radio link; if the data of all radio links are incorrect, the base station selects data of two radio links of which signal quality is best among the data of all radio links so as to perform the error re-correction. The base station controller compares corresponding bits of the data of two radio links one by one, finds difference bit position numbers, and combines these position numbers into a difference bit position sequence. It is to perform incorrect route segmentation processing on the data of two radio links according to the difference bit position sequence, the condition of the incorrect route segmentation is that, it is to calculate a distance between two adjacent elements m and m+1 in the difference bit position sequence, and if the distance is less than a predetermined threshold (the constant N), it is determined that the elements m+1 and m belong to a same incorrect route group. The base station controller traverses all elements in the difference bit position sequence according to the above condition of the incorrect route segmentation, and calculates the incorrect route groups to which each element belongs. The base station controller performs an error correction attempt on two radio links on which the incorrect route segmentation processing has been performed, and after each error correction attempt, it judges whether the error correction is successful through CRC check, that is, the base station controller selects an incorrect route group of the data of two radio links to perform the cross substitution processing and re-calculate the CRC, and if the result of the CRC check is correct, it determines the error re-correction is successful, otherwise, it selects a next incorrect route group and repeats the above steps.

Figure 2:
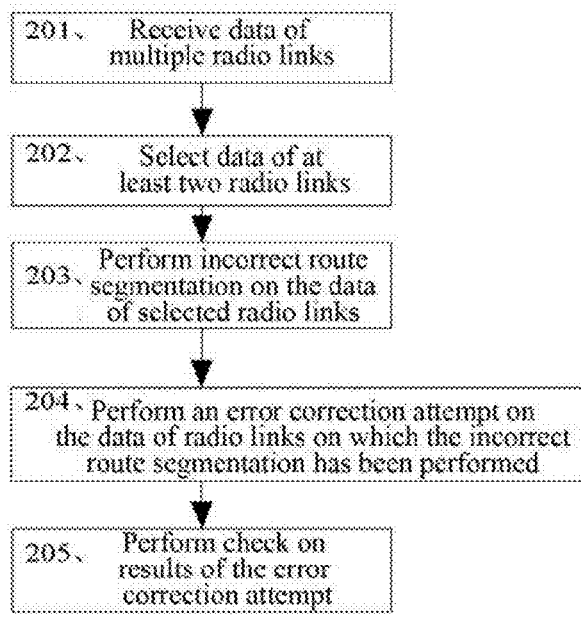
FIG. 2 is a principle block diagram of a method of error re-correction for data of a radio link provided by an embodiment of the present invention.

FIG. 2 is a principle block diagram of an error re-correction method for data of a radio link provided by an embodiment of the present invention, and as shown in FIG. 2, the method includes the following steps.

In step 201, a base station controller receives data of multiple radio links of a same user equipment, which are decoded by multiple base stations.

The multiple base stations respectively perform decoding and cyclic redundancy check processing on the received data of the multiple radio links from the same user equipment, and respectively send the data of the radio links including check results to the base station controller, so that the base station controller can receive them and perform the subsequent processing.

In step 202, the base station controller performs selection on the above data of the radio links, if the data of one radio link therein are correct, the base station controller selects the data of this correct radio link; if the data of all radio links are all incorrect, the base station selects data of at least two radio links so as to perform error re-correction.

The base station controller judges whether the received data of the radio links are correct according to the check result in the data of each radio link, and when it is judged that correct data of a radio link exist, the base station controller selects the correct data of the radio link, and when it is judged that correct data of a radio link do not exist, the base station controller selects data of at least two radio links to perform the error re-correction, and preferably, it selects data of two links therein of which the signal quality is best to perform the error re-correction.

The purpose for selecting data of at least two radio links from the data of the multiple radio links is that, when the error re-correction for the combination of the data of two radio links therein fails, it can select the combination of the data of anther two radio links to perform the error re-correction attempt again, so as to obtain correct data of a radio link through the error re-correction.

In step 203, the base station controller compares the data of the above two radio links one by one, obtains a difference bit position sequence and then performs the incorrect route segmentation processing.

The base station performs bitwise comparison processing on the data of the two radio links therein, and obtains a difference bit position sequence of the data of the two radio links; it performs incorrect route segmentation processing on the data of the two radio links according to the difference bit position sequence, and obtains multiple incorrect route groups. Wherein, the step of the bitwise comparison processing comprises that, it is to perform bitwise comparisons on the data of the two radio links successively, obtain a difference bit position sequence in which difference bit position numbers are taken as sequence elements, and the difference bit position numbers refer to bit numbers of the data of the two radio links which have different bit values. The step of the incorrect route segmentation processing comprises that: it is to calculate a distance between adjacent difference bit position numbers in the data of the two radio links according to adjacent difference bit position numbers in the difference bit position sequence; compare the distance between the adjacent difference bit position numbers with a predetermined distance threshold, if the distance is less than the predetermined distance threshold, it is to classify bits corresponding to the adjacent difference bit position numbers into a same incorrect route group, and segment the data of the two radio links respectively according to an incorrect route group to which a bit corresponding to each difference bit position number belongs, and obtain multiple incorrect route groups of the data of the two radio links.

In step 204, the base station controller perform an error correction attempt on the two radio links on which the incorrect route segmentation has been performed, that is, the base station controller selects one incorrect route group of the data of two radio links to perform the cross substitution processing.

In step 205, after the base station controller performs the error correction attempt, it is to judge whether the error correction is successful through the CRC check, and if the result of the CRC check is correct, the base station controller determines the error re-correction is successful, otherwise, it selects a next incorrect route group and repeats the step 204. That is, the base station controller performs the cross substitution processing on incorrect route groups in the data of the two radio link by groups, and performs check processing on obtained data of the new radio links, until data of the radio links that are checked successfully are obtained.

It is to perform cross substitution on the Nth incorrect route group in the data of the two radio links, the N is greater than or equal to 1; it is to perform the cyclic redundancy check processing respectively on data of two radio links obtained through the cross substitution, and when data of a radio link on which the cyclic redundancy check is performed successfully exist, it is to select the data of the radio link on which the cyclic redundancy check is performed successfully after the cross substitution; when the cyclic redundancy check fails, it is to perform the cross substitution processing on a N+1th incorrect route group in the data of the two radio link, then perform the cyclic redundancy check processing on data of radio links obtained through the cross substitution, until data of a radio link on which the cyclic redundancy check is performed successfully are obtained.

Figure 3:
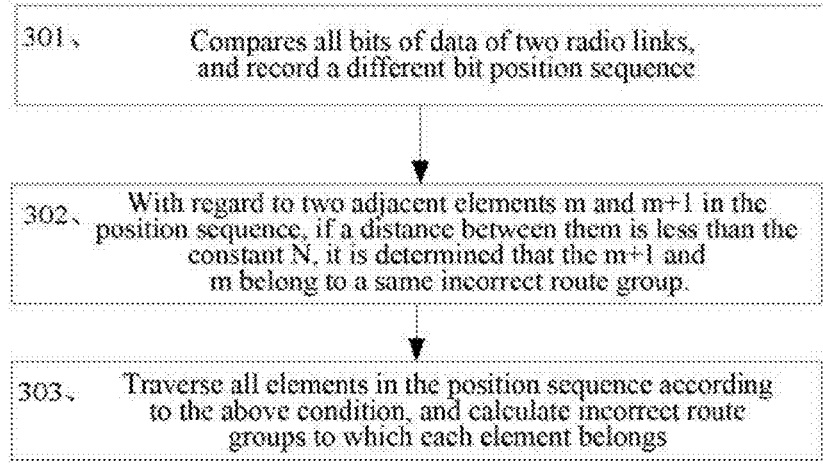
FIG. 3 is a block diagram of incorrect route segmentation processing of the data of the radio link provided by an embodiment of the present invention.

FIG. 3 is a block diagram of incorrect route segmentation processing of the data of the radio link provided by an embodiment of the present invention, and as shown in FIG. 3, the method includes the following steps.

In step 301, a base station controller compares all bits of data of two radio links, and records the positions of difference bit, that is, the base station controller compares corresponding bits of the data of the two radio links one by one, finds difference bit position numbers and combines these position numbers into a difference bit position sequence.

In step 302, the base station controller performs incorrect route segmentation processing on the data of the two radio links according to the above difference bit position sequence. The condition of the incorrect route segmentation is that: with regard to two adjacent elements m and m+1 in the difference bit position sequence, if the distance is less than the constant N, it is determined that the elements m+1 and m belong to a same incorrect route group.

In step 303, the base station controller traverses all elements in the difference bit position sequence according to the above condition of the incorrect route segmentation, and calculates incorrect route groups to which each element belongs.

The embodiment of the present invention further provides an apparatus of error re-correction for data of a radio link, which comprises that:

a data receiving module is configured to receive data of a plurality of radio links of a same user equipment on which decoding and cyclic redundancy check processing have been performed respectively by a plurality of base stations, wherein the data of the plurality of radio links include check results of the cyclic redundancy check processing.

A radio link data judgment module is configured to judge whether the received data of radio links are correct according to a check result in the data of each radio link;

a radio link data selection module is configured to, when it is determined that correct data of a radio link exist, select the data of the radio link.

A difference bit position sequence determining module is configured to, when data of a plurality of radio links of received by a base station controller are all incorrect, perform bitwise comparison processing on data of two radio links therein and obtain a difference bit position sequence of the data of the two radio links. The difference bit position sequence determining module comprises a data selection submodule and a bitwise comparison submodule. The data selection submodule is configured to, when the data of the plurality of radio links are all incorrect, select data of two radio links from the data of the plurality of the radio links. The bitwise comparison submodule is configured to perform bitwise comparisons on the data of the two radio links successively, obtain a difference bit position sequence in which difference bit position numbers are taken as sequence elements, wherein the difference bit position numbers refer to bit numbers of the data of the two radio links which have different bit values.

An incorrect route group determining module is configured to perform incorrect route segmentation processing on the data of the two radio links according to the difference bit position sequence, obtain a plurality of incorrect route groups. The incorrect route group determining module comprises a distance calculation submodule, a distance comparison submodule, an error route group classifying submodule and an error re-correction module. The distance calculation module, is configured to calculate a distance between adjacent difference bit position numbers in the data of the two radio links according to adjacent difference bit position numbers in the difference bit position sequence; the distance comparison submodule is configured to compare the distance between the adjacent difference bit position numbers with a predetermined distance threshold; the incorrect route group classifying submodule is configured to, when the distance is less than the predetermined distance threshold, classify bits corresponding to the adjacent difference bit position numbers into a same incorrect route group; the incorrect route group segmentation submodule is configured to segment the data of the two radio links respectively according to an incorrect route group to which a bit corresponding to each difference bit position number belongs, and obtain a plurality of incorrect route groups of the data of the two radio links.

An error re-correction module is configured to perform cross substitution processing on incorrect route groups in the data of the two radio links by groups, and perform check processing on obtained data of new radio links, until data of radio links that are checked successfully are obtained. The error re-correction module comprises a cross substitution submodule, a redundancy check submodule and a data selection submodule. The cross substitution submodule is configured to perform cross substitution on a Nth incorrect route group in the data of the two radio links, wherein the N is greater than or equal to 1. The redundancy check submodule is configured to perform cyclic redundancy check processing respectively on data of two radio links obtained through the cross substitution. The data selection submodule is configured to, when data of a radio link on which the cyclic redundancy check is performed successfully exist, select the data of the radio link on which the cyclic redundancy check is performed successfully after the cross substitution; when the cyclic redundancy check fails, the cross substitution submodule performs cross substitution on a N+1th incorrect route group in the data of the two radio link, then the redundancy check submodule performs cyclic redundancy check processing on data of radio links obtained through the cross substitution, until data of a radio link on which the cyclic redundancy check is performed successfully are obtained.

Figure 4:
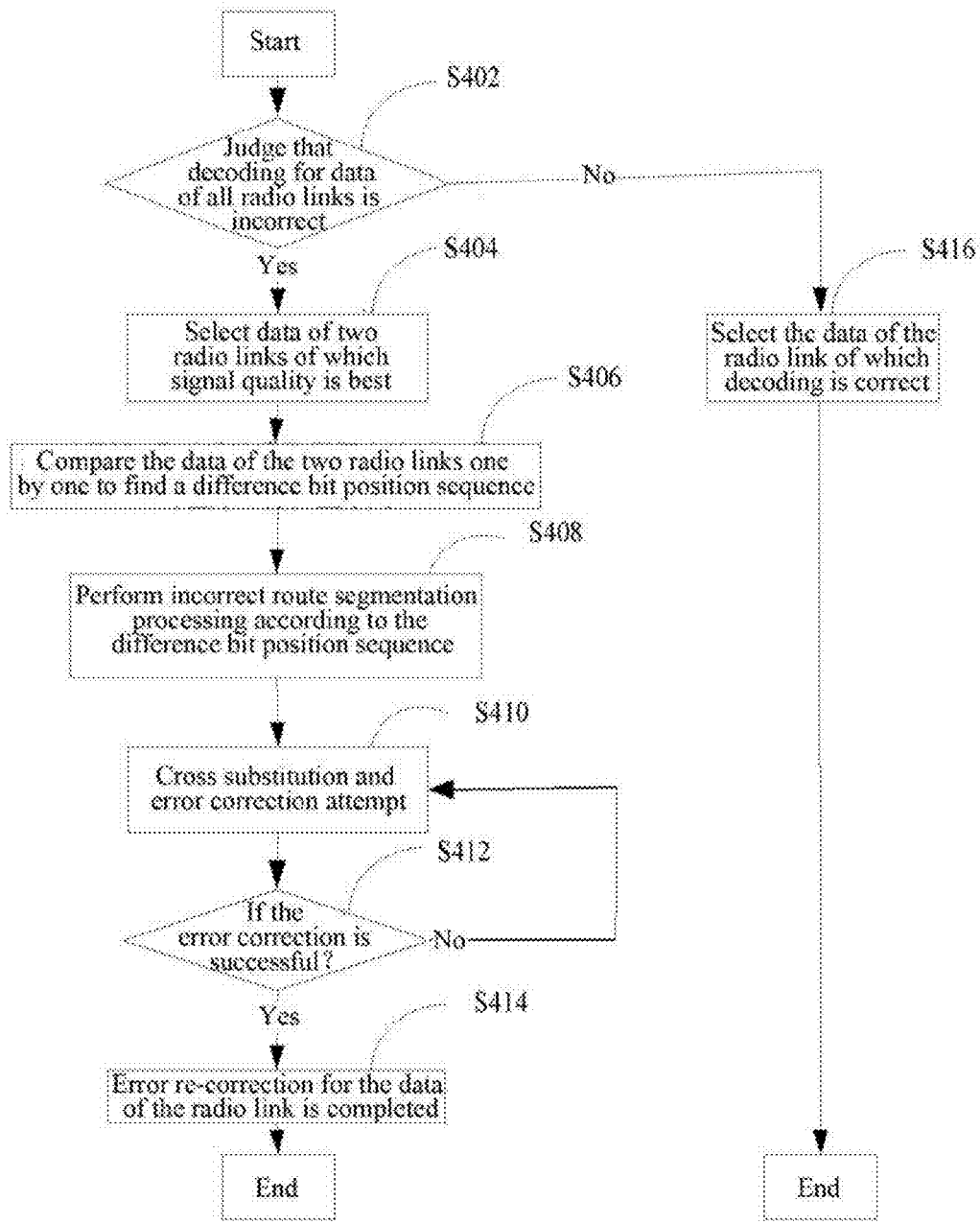
FIG. 4 is a flow chart of the method of error re-correction for data of a radio link provided by an embodiment of the present invention.

FIG. 4 is a flow chart of the method of error re-correction for data of a radio link provided by an embodiment of the present invention, and as shown in FIG. 4, the method includes the following steps.

In step S402, a base station controller receives data of a plurality of radio links from a same user equipment through a base station, and judges whether the decoding for the data of the radio links is correct, and if the decoding for all the data of the radio links is incorrect, it is required to perform error re-correction processing on the data of the radio links, and it is to perform step S404, otherwise, it is directly to output data of a radio link which are decoded correctly, and it is to perform step S416.

In step S404, in a soft handover scenario, the number of the radio links of a same user equipment, of which the data are received by a base station controller, may be greater than 2, and in order to reduce the processing complexity in the implementation, preferably, it is to select data of two radio links of which signal quality is best to perform processing. It is assumed that the data of the two radio links are RL1 and RL2 respectively.

In step 406, the base station controller numbers the RL1 and RL2 in bits respectively, and obtains RL1(x) and RL2(x), wherein x=1~M, x is the position number of the data of the radio link and M is the length of data of the radio link. It is to compare bit values of a same position number in the RL1(x) and RL2(x) bit-by-bit, and if the bit values of the same position number are different, they are referred to as the difference bit, and the position number of each difference bit is recorded, combining these position numbers in turn to form a difference bit position sequence.

In step S408, the base station controller performs incorrect route segmentation processing according to the difference bit position sequence. The condition of the incorrect route segmentation is that: with regard to two adjacent elements m and m+1 in the position sequence, if a distance between them is less than a constant N, it is determined that the elements m+1 and m belong to a same incorrect route group. The base station controller traverses all elements in the difference bit position sequence according to the above condition of the incorrect route segmentation, and calculates the incorrect route groups to which each element belongs, and then segments the data of the radio link into a plurality of incorrect route groups.

In step S410, the base station controller performs an error correction attempt on the data of the two radio links, and the base station controller selects one incorrect route group of the data of two radio links at each time to perform cross substitution processing, and obtains data of two new radio links.

In step S412, the base station controller performs CRC check on the data of the two new radio links, if the result of CRC check is correct, it is determined that the error re-correction is successful, and it is to perform step S414, otherwise, it selects a next incorrect route group, and it is to perform S410.

In step S414, the error re-correction for the data of the radio link is completed, and the data of the new radio link on which the CRC check is successfully performed are selected.

In step S416, the base station controller selects the data of the radio link which is decoded correctly.

Figure 5:
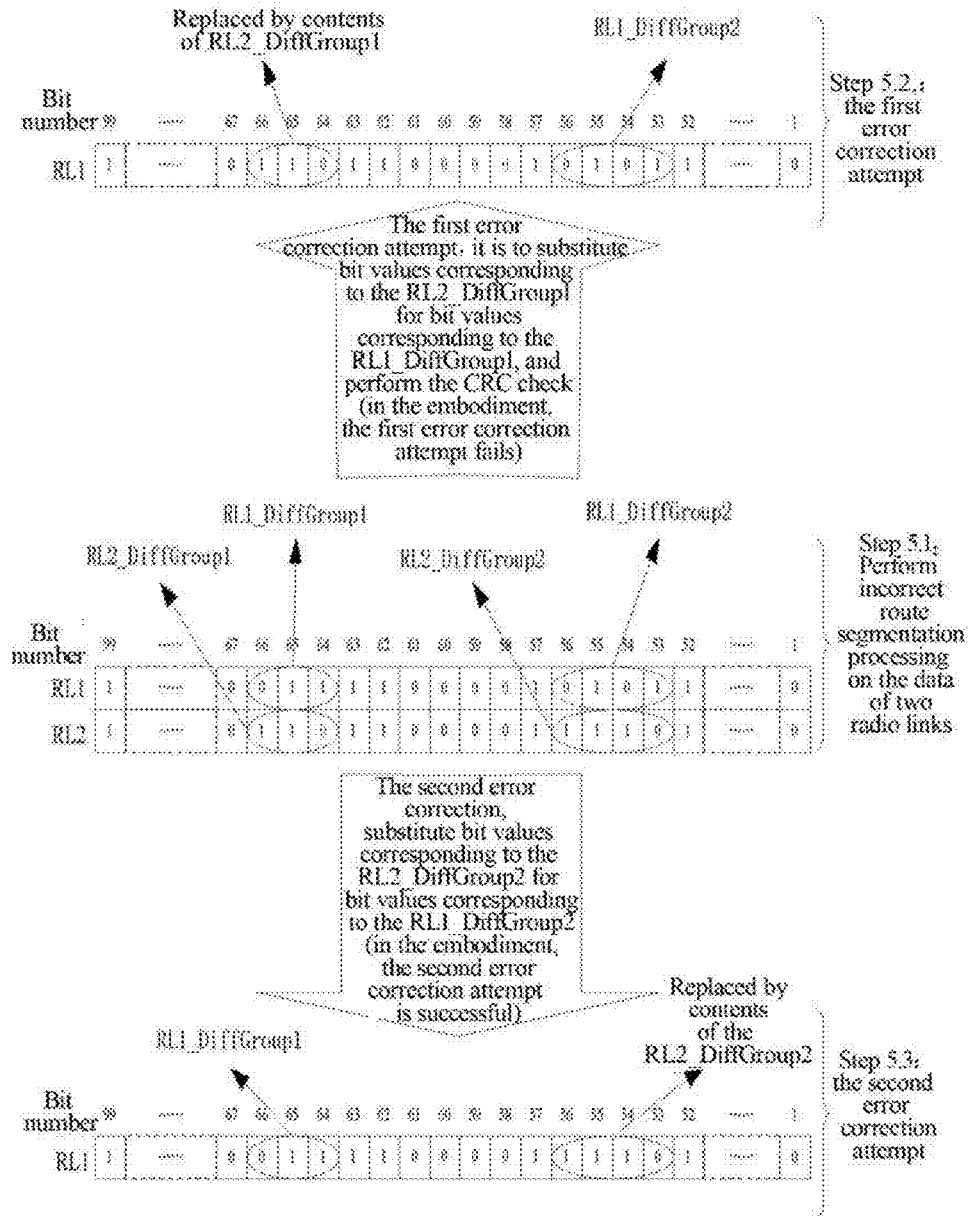
FIG. 5 is a schematic diagram of cross error re-correction for data of two radio links provided by an embodiment of the present invention.

FIG. 5 is a schematic diagram of cross error correction for data of two radio links provided by an embodiment of the present invention; as shown in FIG. 5, the following steps are included.

In step 5.1, a base station controller performs the incorrect route segmentation processing on the data of the two radio links RL1 and RL2 and obtains two incorrect route groups.

It is to perform bitwise comparison on the data of the two radio links RL1 and RL2 to obtain a difference bit position sequence in the present embodiment: 53, 54, 55, 56, 64, 65, 66. It is to perform incorrect route segmentation processing respectively on the RL1 and RL2 according to the difference bit position sequence to obtain two incorrect route groups which are respectively DiffGroup1 and DiffGroup2, that is, for the data of the radio link RL1, the difference bits corresponding to two incorrect route groups are defined as RL1_DiffGroup1 and RL1_DiffGroup2, and for the data of the radio link RL2, the difference bits corresponding to two incorrect route groups are defined as RL2_DiffGroup1 and RL2_DiffGroup2.

In step 5.2, the base station controller performs the error correction attempt processing for the first time.

For the data of the radio link RL1, it is to substitute bit values corresponding to the RL2_DiffGroup1 for bit values corresponding to the RL1_DiffGroup1. After the substitution, it is to perform the CRC check on obtained data of the new radio link RL1. In the embodiment, the CRC check here is incorrect, and it is to continue to a next step to perform the error re-correction attempt processing.

In step 5.3, the base station controller performs the error correction attempt processing for the second time.

For the data of the radio link RL1, it is to substitute bit values corresponding to the RL2_DiffGroup2 for bit values corresponding to the RL1_DiffGroup2. After the substitution, it is to perform the CRC check on obtained data of the new radio link RL1. In the embodiment, here, the CRC check is correct, and the error correction is successful.

Figure 6:
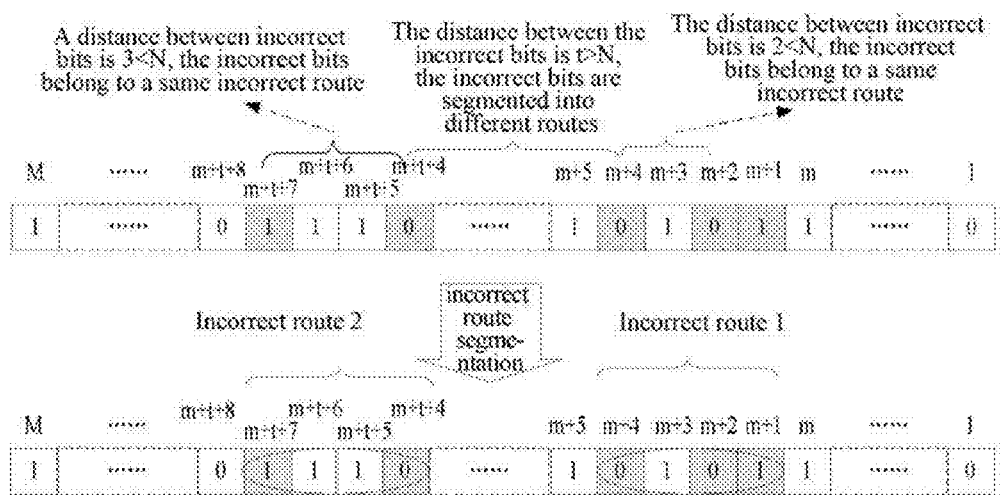
FIG. 6 is a schematic diagram of incorrect route segmentation processing of the data of the radio link provided by an embodiment of the present invention.

FIG. 6 is a schematic diagram of incorrect route segmentation processing of the data of the radio link provided by an embodiment of the present invention, and as shown in FIG. 6, assuming t>N>5, the base station controller selects data of two radio links, compares corresponding bits in the data of the two radio links bit by bit, finds out the difference bit position number and combines these position numbers into a difference bit position sequence, and in the embodiment, the difference bit position sequence is m+1, m+2, m+4, m+t+4 and m+t+7.

The base station controller performs the incorrect route segmentation processing on the data of radio links according to the difference bit position sequence. The condition of the incorrect route segmentation is that: if a distance between two adjacent elements in the difference position sequence is less than the constant N, it is determined that the two adjacent elements belong to a same incorrect route group.

According to the condition of the incorrect route segmentation, it can be known that bits corresponding to the position numbers m+1, m+2 and m+4 belong to a same incorrect route group, which can be recorded as group 1, and bits corresponding to the position numbers m+t+4 and m+t+7 belong to a same incorrect route group, which can be recorded as group 2. For example, a distance between two adjacent elements m+2 and m+4 in the difference bit position sequence is 2, which is less than N, thereby, bits corresponding to the m+2 and m+4 belong to a same incorrect route group. A distance between two adjacent elements m+4 and m+t+4 in the difference bit position sequence is t, which is greater than N, thereby, bits corresponding to the m+4 and m+t+4 do not belong to a same incorrect route group.

The embodiments of the present invention can also have a variety of other embodiments, and without departing from the spirit and essence of the present document, a person skilled in the art may make one or more corresponding changes and modifications according to the embodiments of the present invention, and these corresponding changes and modifications shall belong to the protection scope of the appended claims of the present document.

Although the above text describes the embodiment of present invention in detail, the embodiment of present invention is not limited here. Those skilled in the art can make various modifications according to the principles of the embodiment of present invention. Therefore, and all the modifications made according to the principles of the embodiment of present invention should be understood to be included in the protection scope of the embodiment of present invention.

INDUSTRIAL APPLICABILITY

The embodiments of the present invention can achieve the error re-correction for the data of the radio link under the soft handover scenario, which can effectively improve the success rate of the soft handover, uplink capacity of the system and the standby time of the user equipment.

What is claimed is:
1. A method of error re-correction for data of a radio link, comprising:
when data of a plurality of radio links of a same user equipment received by a base station controller are all incorrect, the base station controller performing bitwise comparison processing on data of two radio links among the plurality of radio links, obtaining a difference bit position sequence of the data of the two radio links;
performing incorrect route segmentation processing on the data of the two radio link according to the difference bit position sequence, obtaining a plurality of incorrect route groups;

performing cross substitution processing on incorrect route groups in the data of the two radio links by groups, and performing check processing on obtained data of a new radio link, until obtaining data of a radio link that are checked successfully.

2. The method of claim 1, before the step of performing bitwise comparison processing, the method further comprises:
a plurality of base stations respectively performing decoding and cyclic redundancy check processing on the received data of the plurality of radio links from the same user equipment, and respectively sending data of radio links including check results to the base station controller;
the base station controller judging whether the received data of radio links are correct according to a check result in data of each radio link;
when determining that correct data of a radio link exist, selecting the data of the radio link.

3. The method according to claim 2, wherein the step of the bitwise comparison processing comprises:
when the base station controller determines that the data of the plurality of radio links are all incorrect, the base station controller selecting data of at least two radio links from the data of the plurality of the radio links;
selecting data of two radio links from the data of the selected radio links and performing bitwise comparisons on the data of the two radio links successively, obtaining a difference bit position sequence in which difference bit position numbers are taken as sequence elements;
wherein the difference bit position numbers refer to bit numbers of the data of the two radio links which have different bit values.

4. The method according to claim 3, wherein the step of the incorrect route segmentation processing comprises:
calculating a distance between adjacent difference bit position numbers in the data of the two radio links according to adjacent difference bit position numbers in the difference bit position sequence;
comparing the distance between the adjacent difference bit position numbers with a predetermined distance threshold;
if the distance is less than the predetermined distance threshold, classifying bits corresponding to the adjacent difference bit position numbers into a same incorrect route group;
segmenting the data of the two radio links respectively according to an incorrect route group to which a bit corresponding to each difference bit position number belongs, obtaining a plurality of incorrect route groups of the data of the two radio links.

5. The method according to claim 4, wherein the step of obtaining data of a radio link which are checked successfully comprises:
performing cross substitution on a Nth incorrect route group in the data of the two radio links, wherein, the N is greater than or equal to 1;
performing cyclic redundancy check processing respectively on data of the two radio links obtained through the cross substitution;
when data of a radio link on which a cyclic redundancy check is performed successfully exist, selecting the data of the radio link on which the cyclic redundancy check is performed successfully after the cross substitution;
when the cyclic redundancy check fails, performing cross substitution on a N+1th incorrect route group in the data of the two radio links, performing cyclic redundancy check processing on data of radio links obtained through the cross substitution, until obtaining data of a radio link on which the cyclic redundancy check is performed successfully.

6. An apparatus of error re-correction for data of a radio link comprised in a base station controller, comprising hardware performing instructions stored in a non-transitory computer readable medium which executes steps in following modules:
a difference bit position sequence determining module, configured to, when data of a plurality of radio links of a same user equipment received by a base station controller are all incorrect, perform bitwise comparison processing on data of two radio links among the data of the plurality of radio links, and obtain a difference bit position sequence of the data of the two radio links;
an incorrect route group determining module, configured to perform incorrect route segmentation processing on the data of the two radio link according to the difference bit position sequence, and obtain a plurality of incorrect route groups;
an error re-correction module, configured to perform cross substitution processing on incorrect route groups in the data of the two radio links by groups, and perform check processing on obtained data of new radio links, until data of radio links that are checked successfully are obtained.

7. The apparatus of claim 6, further comprising:
a data receiving module, configured to receive data of a plurality of radio links of a same user equipment on which decoding and cyclic redundancy check processing have been performed respectively by a plurality of base stations, wherein the data of the plurality of radio links include check results of the cyclic redundancy check processing;
a radio link data judgment module, configured to judge whether the received data of the plurality of radio links are correct according to a check result in the data of each radio link;
a radio link data selection module, configured to, when that there are correct data of a radio link is determined, select the data of the radio link.

8. The apparatus of claim 7, wherein the difference bit position sequence determining module comprises:
a data selection submodule, configured to, when the data of the plurality of radio links are all incorrect, select data of at least two radio links from the data of the plurality of the radio links;
a bitwise comparison submodule, configured to select data of two radio links from the data of the selected radio links and perform bitwise comparisons on the data of the two radio links successively, and obtain a difference bit position sequence in which difference bit position numbers are taken as sequence elements, wherein the difference bit position numbers refer to bit numbers of the data of the two radio links which have different bit values.

9. The apparatus of claim 8, wherein the incorrect route group determining module comprises:
a distance calculation submodule, configured to calculate a distance between adjacent difference bit position numbers in the data of the two radio links according to adjacent difference bit position numbers in the difference bit position sequence;

a distance comparison submodule, configured to compare the distance between the adjacent difference bit position numbers with a predetermined distance threshold;

an incorrect route group classifying submodule, configured to, if the distance is less than the predetermined distance threshold, classify bits corresponding to the adjacent difference bit position numbers into a same incorrect route group;

an incorrect route group segmentation submodule, configured to segment the data of the two radio links respectively according to an incorrect route group to which a bit corresponding to each difference bit position number belongs, and obtain a plurality of incorrect route groups of the data of the two radio links.

10. The apparatus of claim 9, wherein the error re-correction module comprises:

a cross substitution submodule, configured to perform cross substitution on a Nth incorrect route group in the data of the two radio links, wherein the N is greater than or equal to 1;

a redundancy check submodule, configured to perform cyclic redundancy check processing respectively on data of two radio links obtained through the cross substitution;

a data selection submodule, configured to, when data of a radio link on which a cyclic redundancy check is performed successfully exist, select the data of the radio link on which the cyclic redundancy check is performed successfully after the cross substitution; when the cyclic redundancy check fails, the cross substitution submodule performs cross substitution on an N+1th incorrect route group in the data of the two radio link, then the redundancy check submodule performs cyclic redundancy check processing on data of radio links obtained through the cross substitution, until data of a radio link on which the cyclic redundancy check is performed successfully are obtained.

* * * * *